United States Patent
Rehme et al.

(10) Patent No.: US 9,914,083 B2
(45) Date of Patent: Mar. 13, 2018

(54) STEAM STRAINER

(71) Applicant: Siemens Aktiengesellschaft, Munich (DE)

(72) Inventors: Olaf Rehme, Hamburg (DE); Armin Trubel, Schwabach (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 14/652,107

(22) PCT Filed: Dec. 5, 2013

(86) PCT No.: PCT/EP2013/075612
§ 371 (c)(1),
(2) Date: Jun. 13, 2015

(87) PCT Pub. No.: WO2014/095380
PCT Pub. Date: Jun. 26, 2014

(65) Prior Publication Data
US 2015/0328574 A1    Nov. 19, 2015

(30) Foreign Application Priority Data
Dec. 20, 2012  (EP) .................................... 12198304

(51) Int. Cl.
  *B01D 46/00* (2006.01)
  *B01D 46/10* (2006.01)
(52) U.S. Cl.
  CPC ....... *B01D 46/002* (2013.01); *B01D 46/0001* (2013.01); *B01D 46/103* (2013.01); *Y10T 29/49828* (2015.01)
(58) Field of Classification Search
  CPC .......................... B01D 46/002; B01D 46/0001; B01D 46/103; Y10T 29/49828
  See application file for complete search history.

(56) References Cited

U.S. PATENT DOCUMENTS 3,757,496 A * 9/1973 Berg .................. B01D 46/0013
  55/293
4,100,248 A * 7/1978 Adams ................. B01D 29/012
  162/903
(Continued)

FOREIGN PATENT DOCUMENTS

CN   201337858 Y    11/2009
DE     375304 C     5/1923
(Continued)

OTHER PUBLICATIONS

Yadroitsev "Manufacturing of fine-structured 3D porous filter elements by selective laser melting", Aug. 3, 2008, Applied Surface Science, 255 (2009), 5523-5527.*
(Continued)

*Primary Examiner* — Amber R Orlando
*Assistant Examiner* — Brittany Precht
(74) *Attorney, Agent, or Firm* — Beusse Wolter Sanks & Maire

(57) ABSTRACT

A steam strainer and a method for producing a steam strainer is provided. The steam strainer has a skeleton-like tube body, in which, to construct a shell surface, at least two shell-type individual elements are provided for mounting, wherein the skeleton-like tube body has two end surfaces which are kept at a defined spacing by at least one longitudinal strut connecting the two end surfaces, and wherein the at least two shell-type individual elements have a plurality of screen openings, and wherein the at least two shell-type individual elements and the longitudinal strut are independently exchangeable. In addition, a method for producing such a steam strainer is provided.

19 Claims, 2 Drawing Sheets

(56) References Cited

U.S. PATENT DOCUMENTS

| | | | |
|---|---|---|---|
| 4,481,021 A * | 11/1984 | Kinney, Jr. | B01D 46/26 210/402 |
| 4,986,900 A | 1/1991 | Mason | |
| 5,531,892 A * | 7/1996 | Duffy | B01D 29/012 210/493.1 |
| 5,575,618 A | 11/1996 | Brandon et al. | |
| 5,679,122 A * | 10/1997 | Moll | B01D 46/0005 210/493.3 |
| 8,292,982 B2 * | 10/2012 | Gennaro | B01D 39/20 210/506 |
| 2008/0109102 A1 | 5/2008 | Sutcliffe | |
| 2009/0145841 A1 * | 6/2009 | Arai | B01D 29/012 210/497.3 |
| 2013/0092798 A1 * | 4/2013 | Boyce | B01D 46/103 244/53 B |
| 2014/0371679 A1 | 12/2014 | Woolley et al. | |

FOREIGN PATENT DOCUMENTS

| | | | |
|---|---|---|---|
| DE | 2350488 A1 | 4/1975 |
| DE | 2649376 A | 5/1977 |
| DE | 2619403 A1 | 11/1977 |
| DE | 102009007240 A1 | 8/2010 |
| DE | 102009029679 A1 | 3/2011 |
| EP | 1806168 A1 | 7/2007 |
| FR | 2246297 A1 | 5/1975 |
| JP | S6017222 U | 2/1985 |
| JP | S61195316 U | 12/1986 |
| JP | S6334304 U | 3/1988 |
| JP | H0457208 U | 5/1992 |
| JP | H04504286 A | 7/1992 |
| JP | H07289819 A | 11/1995 |
| JP | 2006526524 A | 11/2006 |
| JP | 2015506248 A | 3/2015 |
| WO | 2010089250 A2 | 8/2010 |

OTHER PUBLICATIONS

CN Office Action dated Aug. 8, 2016, for CN application No. 2013800675918.

JP Office Action dated Aug. 8, 2016, for JP patent application No. 2015-548338.

* cited by examiner

STEAM STRAINER

CROSS REFERENCE TO RELATED APPLICATIONS

This application is the US National Stage of International Application No. PCT/EP2013/075612 filed Dec. 5, 2013, and claims the benefit thereof. The International Application claims the benefit of European Application No. EP12198304 filed Dec. 20, 2012. All of the applications are incorporated by reference herein in their entirety.

FIELD OF INVENTION

The invention relates to a steam strainer and to a method for manufacturing such a steam strainer.

BACKGROUND OF INVENTION

A steam strainer is a component within a quick-closing valve in turbomachines. A quick-closing valve allows abrupt interruption of a pipe flow. The steam strainer serves to protect the quick-closing valve, especially the moving parts and those that follow from foreign bodies which are carried with the flow and which can lead to breakdown of the quick-closing valve or to damage to subsequent plant parts, such as the blades.

In a common embodiment, the steam strainer has a sleeve-like shape with a cylindrical or conical lateral surface, the strainer surface, which is flowed through from the outside inward. A disadvantage of using steam strainers is the increase in flow resistance of the relevant steam passage and the high pressure losses in the flow. In particular, simple wound strainers and hole strainers produce very high pressure losses which have a negative effect on the power of the steam turbine.

DE 375 304 C discloses a steam strainer in which a strainer body which is produced by winding mutually adjacent wires onto a filter drum.

DE 102009007240 A1 discloses a steam strainer with a corrugated strainer surface.

However, steam strainers are subjected to the loads prevailing in a steam turbine, for example the vibratory loads or the temperature variations. These can destroy the steam strainer after a relatively short service time.

The suitability of the steam strainer for repairs is very limited. If the flowed-through surface is clogged by foreign particles, or if the lateral surface is damaged, it is usually necessary to exchange the entire steam strainer. In addition, it is substantially more difficult to produce a lateral surface with an optimized through-flow surface using conventional production technologies, for example turning, milling, boring or welding. This is however very cost-intensive.

SUMMARY OF INVENTION

The invention therefore has a first object of proposing a steam strainer which overcomes the abovementioned problem. A second object is to propose a manufacturing method for such a steam strainer.

The first object is achieved by proposing a steam strainer which has a skeleton-like tubular body in which, for forming a lateral surface, at least two shell-like individual elements are provided to be attached, wherein the skeleton-like tubular body has two end surfaces which are held at a defined separation by at least one longitudinal strut connecting the two end surfaces and wherein the at least two shell-like individual elements have multiple strainer openings and wherein the at least two shell-like individual elements and the at least one longitudinal strut can be exchanged separately.

Thus, according to aspects of the invention, the lateral surface of the steam strainer is formed from multiple individual elements. This corresponds to a modular construction. At least the two shell-like individual elements and the at least one longitudinal strut can be exchanged separately in the event of damage, such that the other parts of the steam strainer are not damaged during installation and removal. This makes it possible to retain cost-intensive other parts of the steam strainer. Also, costs are prevented by avoiding exchange of the entire steam strainer. It is also possible for maintenance purposes for the steam strainer to be dismantled and for example cleaned. It is thus possible to achieve improved function and a longer life.

Advantageously, the lateral surface formed by the at least two shell-like individual elements is closed, such that the technical requirements imposed on steam strainers, for example filtering foreign bodies, are fulfilled.

The skeleton-like tubular body can additionally have two end surfaces which are held at a defined separation by at least one longitudinal strut connecting the two end surfaces. In that context, it is of course also possible to envisage more longitudinal struts. The at least one longitudinal strut can also be exchanged separately. The at least one longitudinal strut can be secured to the two end surfaces by means of securing elements. In this context, these can be a releasable connection such that, in the event of damage, it is also possible to separately exchange the at least one longitudinal strut or the two or one of the two end surfaces without damaging other parts of the steam strainer during installation or removal. The shell-like individual elements are essentially held together by a "frame construction" which can be disassembled for, for example, maintenance or repair purposes.

Advantageously, the skeleton-like tubular body has at least one intermediate surface which is connected to the two end surfaces by the at least one longitudinal strut. This intermediate surface is generally parallel to at least one of the two end surfaces. It is thus possible to increase the number of the shell-like individual elements required for the entire lateral surface. Now, in the event of an exchange, a smaller shell-like individual element is to be exchanged, which can result in a reduction in costs. The intermediate surface can also be exchanged separately.

Advantageously, the at least two shell-like individual elements can be attached to the skeleton-like tubular body. This can be done by means of releasable connections such as bolts and nuts.

The second object is achieved by proposing a method for manufacturing a steam strainer, which includes the following steps:—preparing a skeleton-like tubular body which has two end surfaces,—preparing at least two shell-like individual elements,—preparing at least one longitudinal strut which connects the two end surfaces and which holds the two end surfaces at a defined separation,—forming a lateral surface by attaching the at least two shell-like individual elements to the skeleton-like tubular body, such that the at least two shell-like individual elements and the at least one longitudinal strut can be exchanged separately.

The at least two shell-like individual elements are advantageously made by selective laser melting.

In order to keep the production costs of the shell-like individual elements low and at the same time to achieve good through-flow with reduced pressure loss, selective laser melting is used as the production method. This results in low production costs. In addition, it is advantageous that the number of production steps is substantially reduced in comparison with conventional manufacturing methods for comparable lateral surfaces. This is on account of the high degree of freedom in terms of geometry and the near-net production. It is thus also possible to configure the strainer openings of the lateral surface and the lateral surface itself so as to be able to achieve optimum flow guiding with low pressure loss. In particular, this can be achieved in that a cross section, which is formed over the shell-shaped individual elements of the lateral surface in the circumferential direction, is configured such that the through-flowing medium is expediently deflected and the flow speed is reduced over this cross section.

BRIEF DESCRIPTION OF THE DRAWINGS

Further features, properties and advantages of the present invention can be found in the following description with reference to the appended figures, in which.

DETAILED DESCRIPTION OF INVENTION

Figure 1:
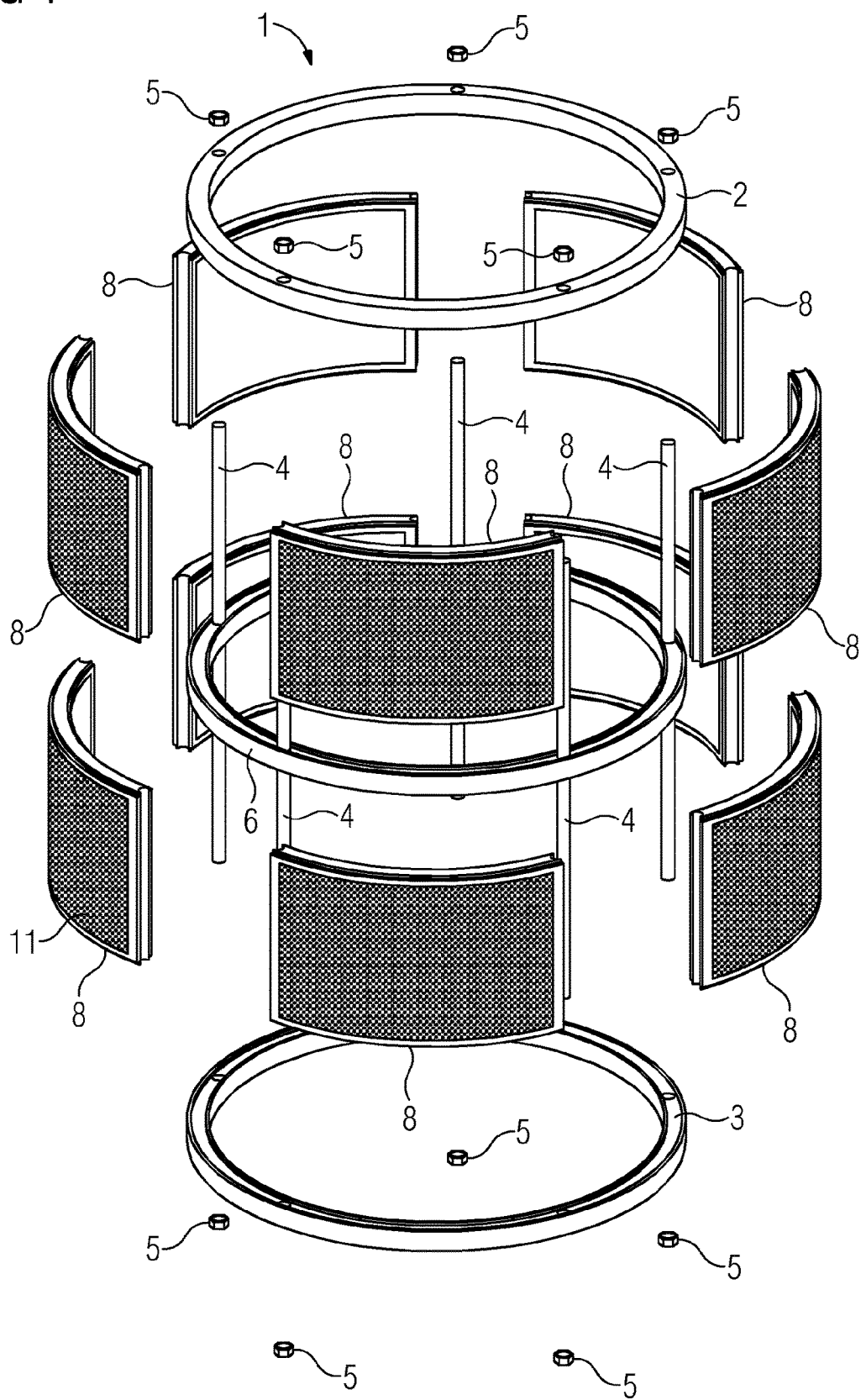
FIG. 1 shows, schematically, an exploded drawing of a steam strainer according to the invention.
Figure 2:
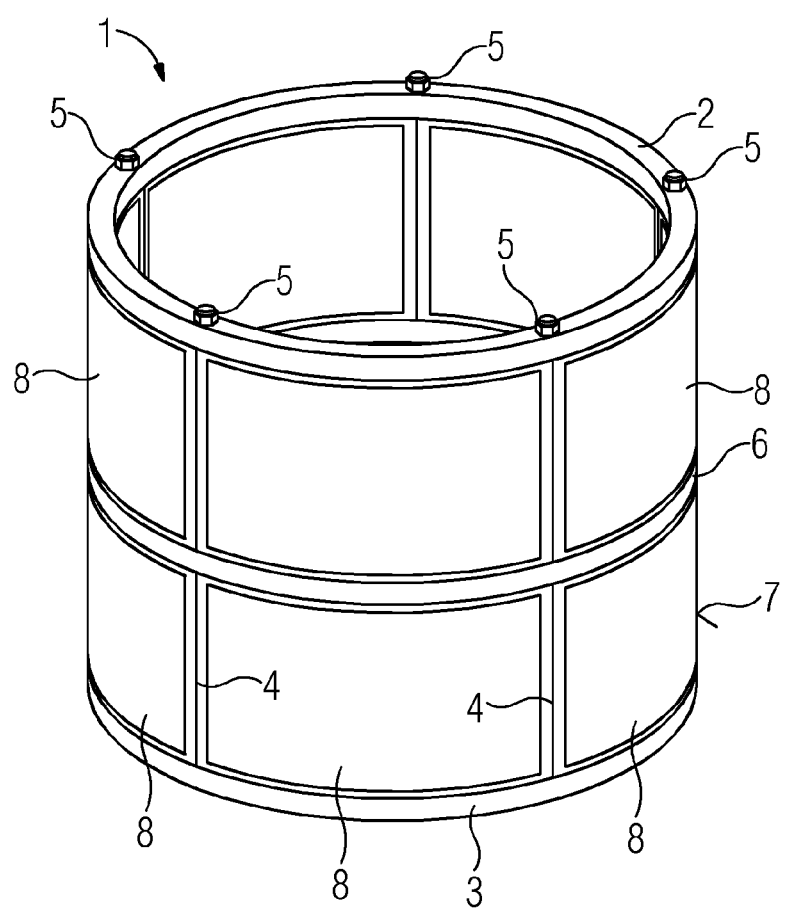
FIG. 2 shows, schematically, a steam strainer according to the invention.

FIG. 1 shows the exploded drawing of a steam strainer 1 according to the invention, which is of modular construction. This comprises a skeleton-like tubular body which includes an upper end surface 2 and a lower end surface 3. In addition, the skeleton-like tubular body also comprises five longitudinal struts 4 which connect the upper end surface 2 and the lower end surface 3 at a defined separation. For securing the longitudinal struts 4 to the end surfaces 2, 3, securing elements 5 can also be used. The longitudinal struts 4 can be releasably attached to the end surfaces 2, 3 such that, in the event of damage, they can be exchanged separately. It is thus also possible for the two end surfaces 2, 3 to be exchanged separately. Any other number of longitudinal struts 4 is of course also possible. In addition, the skeleton-like tubular body also has an intermediate surface 6 which is arranged parallel to the upper end surface 2 and the lower end surface 3 and is connected thereto by the five longitudinal struts 4. This intermediate surface 6 can also be exchanged separately. In that context, for reasons of stiffness, the intermediate surface 6 is advantageously arranged centrally between the upper end surface 2 and the lower end surface 3. Of course, the number of intermediate surfaces 6 is not limited, and it is also possible for the skeleton-like tubular body to have no intermediate surface 6 at all. The lateral surface 7 (FIG. 2) is now formed by multiple shell-like individual elements 8, what are termed tiles. The shell-like individual elements 8 can be secured on the skeleton-like tubular body with the aid of other parts and in a suitable manner, that is to say in this case on the upper end surface 2 or on the lower end surface 3, the longitudinal struts 4 and the intermediate surface 6 such that there results an entire, closed lateral surface 7 (FIG. 2). For example, the shell-like individual elements 8 can be pushed into the end surface 2 and the end surface 3, and also the longitudinal struts 4. In addition, the shell-like individual elements 8 have multiple strainer openings 11. In that context, the strainer openings 11 can take the form of lamellae or be holes or other known strainer openings 11. The shell-like individual elements 8 are mounted in such a manner that there results a closed lateral surface 7 (FIG. 2) which satisfies the technical requirements for a steam strainer 1. In addition, the shell-like individual elements 8 are mounted in such a manner that, in the event of damage, for example clogging with small particles, the shell-like individual elements 8 can be exchanged separately. It is thus possible to retain cost-intensive other parts of the steam strainer 1. Equally, costs are prevented by avoiding exchanging the entire steam strainer 1. Since the longitudinal struts 4 or the intermediate surface 6 or the upper end surface 2 and/or the lower end surface 3 are also releasably secured, the modular construction of the steam strainer 1 also allows these parts to be exchanged separately. In that context, the steam strainer 1 is put together in a modular fashion such that removal or installation of individual parts, in particular of the shell-like individual elements 8 does not lead to damage to the other parts of the steam strainer 1.

In order to keep the manufacturing cost of the elements low and at the same time obtain good through-flow with reduced pressure loss, the shell-like individual elements 8 can be produced using selective laser melting (SLM). This involves building up the shell-like individual elements 8 layer by layer from a pulverulent, metallic material with the aid of a CAD model. In that context, each layer of powder is heated, using a focused laser beam, in those regions which are predefined by the CAD data, and bonded to the underlying layer, before the next layer of powder is applied. By continually repeating this procedure, it is thus possible to produce the shell-like individual element 8. Advantageous in this context are the high degree of freedom in terms of geometry and the near-net production. Of particular advantage is also that, in comparison with conventional manufacturing methods for a comparable shell-like individual element 8 with strainer openings 11, the number of production steps is substantially reduced, resulting in a great reduction in production costs.

The shell-like individual elements 8 of the lateral surface 7 (FIG. 2) with the strainer openings 11 can be configured using the selective laser melting such that optimum flow guiding can be achieved. This results in a lower pressure loss which leads to higher efficiency of the steam turbine.

In that context, the strainer openings 11 of the shell-like individual elements 8 of the lateral surface 7 (FIG. 2) are configured such that optimum flow guiding is achieved, taking into account restrictions which prevail in the relevant steam turbine. In particular, this can be achieved in that a cross section, which is formed over the shell-shaped individual elements 8 of the lateral surface 7 (FIG. 2) in the circumferential direction, is configured such that the through-flowing medium is expediently deflected and the flow speed is reduced over this cross section.

The invention claimed is:
1. A steam strainer comprising
a cylindrically shaped frame and at least two individual and arcuate shaped strainer elements configured to attach to the frame and form a lateral surface,
wherein the frame comprises an upper end ring, a lower end ring, and a plurality of longitudinal struts connecting the upper end ring to the lower end ring,
wherein each of the at least two strainer elements comprises: a radially outer side that defines part of the lateral surface; a radially inner side; circumferential sides adapted to interlock with the frame; and multiple strainer openings that permit fluid communication through the respective strainer element from the radially outer side to the radially inner side wherein each of the at least two strainer elements and the plurality of longitudinal struts are adapted to be exchanged separately, and wherein the multiple strainer openings are configured to strain foreign bodies carried with a flow of steam.

2. The steam strainer as claimed in claim 1, wherein the lateral surface formed by the at least two strainer elements is closed.

3. The steam strainer as claimed in claim 1, wherein the frame comprises at least one intermediate ring connected to the upper end ring and to the lower end ring by the plurality of longitudinal struts.

4. The steam strainer as claimed in claim 3, wherein the at least one intermediate ring is parallel to at least one of the upper end ring and the lower end ring.

5. The steam strainer as claimed in claim 3, wherein the at least one intermediate ring is adapted to be exchanged separately.

6. A method for manufacturing a steam strainer, comprising:

preparing a cylindrically shaped frame which comprises an upper end ring and a lower end ring, preparing at least two individual, arcuate shaped strainer elements, each comprising multiple strainer openings configured to strain foreign bodies from a flow of steam, preparing at least one longitudinal strut which connects to and which holds the upper end ring and the lower end ring at a defined separation, forming a lateral surface by interlocking at least one circumferential side of each of the at least two strainer elements to the at least one longitudinal strut such that the at least two strainer elements and the at least one longitudinal strut can be exchanged separately.

7. The method for manufacturing a steam strainer as claimed in claim 6, further comprising forming the at least two strainer elements by selective laser melting.

8. The steam strainer as claimed in claim 1, wherein each of the at least two strainer elements comprises a morphology of a metal powder that was melted and then solidified.

9. The steam strainer as claimed in claim 1, wherein the lateral surface defines a cylindrical shape.

10. The steam strainer of claim 1, wherein each strainer element of the at least two strainer elements comprises a recess in at least one of the circumferential sides, the recess configured to interlock with a respective longitudinal strut of the plurality of longitudinal struts.

11. The steam strainer of claim 1, wherein each strainer element of the at least two strainer elements comprises a projection in at least one of the circumferential sides, the projection configured to interlock with a groove in a respective end ring.

12. The steam strainer of claim 3, wherein at least one strainer element of the at least two strainer elements comprises a projection in at least one of the circumferential sides, the projection configured to interlock with a groove in a respective intermediate ring.

13. The steam strainer of claim 3, wherein the steam strainer comprises circumferentially adjacent strainer elements and axially adjacent strainer elements, and wherein the at least one intermediate ring is disposed between the axially adjacent strainer elements.

14. The steam strainer of claim 1, wherein the multiple strainer openings comprise lamellae.

15. The steam strainer of claim 1, wherein the flow of steam is a working fluid in a steam turbine, and wherein the steam strainer is configured to fit into a valve carrying the flow of steam.

16. The steam strainer of claim 1, wherein each radially outer side comprises a curved shape, and the radially outer sides together form a cylindrically shaped lateral surface.

17. The steam strainer of claim 16, wherein the lateral surface maintains a constant diameter along its entire length.

18. A steam strainer, comprising:

a cylindrically shaped frame comprising an upper end ring, an intermediate ring, a lower end ring, and longitudinal struts disposed between the rings;

strainer elements configured to permit a flow of steam to pass therethrough while straining impurities from the flow of steam, wherein each strainer element comprises an arcuate shaped radially outer surface, a radially inner surface, and circumferential sides, wherein at least one circumferential side of each strainer element forms a geometric interlock with the frame to retain the strainer elements in the frame, and wherein when assembled the radially outer surfaces together form a cylindrical shape.

19. The steam strainer of claim 18, where each strainer element comprises geometric features in respective circumferential sides, the geometric features configured to form an interlock with respective adjacent longitudinal struts and a respective adjacent ring.

* * * * *